United States Patent
Wang et al.

(10) Patent No.: US 12,522,841 B2
(45) Date of Patent: Jan. 13, 2026

(54) APPLICATION OF OBF1 TRANSCRIPTION FACTOR IN CHROMOSOME DOUBLING OF PLANT AND TRANSGENIC PLANT CULTIVATION METHOD

(71) Applicant: JIANGSU ACADEMY OF AGRICULTURAL SCIENCES, Nanjing (CN)

(72) Inventors: Hong Wang, Nanjing (CN); Caizhong Jiang, Nanjing (CN); Daoyang Sun, Nanjing (CN)

(73) Assignee: JIANGSU ACADEMY OF AGRICULTURAL SCIENCES, Nanjing (CN)

( * ) Notice: Subject to any disclaimer, the term of this patent is extended or adjusted under 35 U.S.C. 154(b) by 47 days.

(21) Appl. No.: 18/605,899

(22) Filed: Mar. 15, 2024

(65) Prior Publication Data
US 2025/0122520 A1    Apr. 17, 2025

Related U.S. Application Data

(63) Continuation of application No. PCT/CN2023/125620, filed on Oct. 20, 2023.

(30) Foreign Application Priority Data

Oct. 16, 2023 (CN) .......................... 202311335642.2

(51) Int. Cl.
*C12N 15/82* (2006.01)

(52) U.S. Cl.
CPC ..... *C12N 15/8261* (2013.01); *C12N 15/8205* (2013.01)

(58) Field of Classification Search
None
See application file for complete search history.

(56) References Cited

FOREIGN PATENT DOCUMENTS

| | | | |
|---|---|---|---|
| CN | 106561461 A | 4/2017 | |
| CN | 108990793 A | 12/2018 | |
| CN | 113249404 A | 8/2021 | |
| CN | 114517202 A | * 5/2022 | ......... C12N 15/8269 |
| CN | 114946651 A | 8/2022 | |

OTHER PUBLICATIONS

Sun, D., Li, S., Niu, L., Reid, M. S., Zhang, Y., & Jiang, C. Z. (2017). PhOBF1, a petunia ocs element binding factor, plays an important role in antiviral RNA silencing. Journal of Experimental Botany, 68(5), 915-930 (Year: 2017).*

Kámán-Tóth, E., Pogány, M., Dankó, T., Szatmári, Á., & Bozsó, Z. (2018). A simplified and efficient Agrobacterium tumefaciens electroporation method. 3 Biotech, 8, 1-6 (Year: 2018).*

Conner, A. J., Albert, N. W., & Deroles, S. C. (2009). Transformation and regeneration of Petunia. Petunia: Evolutionary, developmental and physiological genetics, 395-409 (Year: 2009).*

Mubmann, V., Serek, M., & Winkelmann, T. (2011). Selection of transgenic Petunia plants using the green fluorescent protein (GFP). Plant Cell, Tissue and Organ Culture (PCTOC), 107, 483-492 (Year: 2011).*

Wang, H., Stier, G., Lin, J., Liu, G., Zhang, Z., Chang, Y., . . . & Jiang, C. Z. (2013). Transcriptome changes associated with delayed flower senescence on transgenic petunia by inducing expression of etr1-1, a mutant ethylene receptor. PloS one, 8(7), e65800 (Year: 2013).*

Nobakht Vakili, A., Bagheri, H., & Azadi, P. (2018). Elimination of macro elements from inoculation and co-cultivation media enhances the efficiency of Agrobacterium-mediated transformation in Petunia. Physiology and Molecular Biology of Plants, 24, 703-710 (Year: 2018).*

Djoko Santoso, et al., Plant biostimulant to improve crops productivity and planters profit, IIOP Conf. Series: Earth and Environmental Science, 2018, pp. 1-6, vol. 183.

Daoyang Sun, et al., PhOBF1, a petunia ocs element binding factor, plays an important role in antiviral RNA silencing, Journal of Experimental Botany, 2017, pp. 915-930, vol. 68 No. 5.

* cited by examiner

*Primary Examiner* — Charles Logsdon
*Assistant Examiner* — Jessica Nicole Stockdale
(74) *Attorney, Agent, or Firm* — Bayramoglu Law Offices LLC

(57) ABSTRACT

An application of an OBF1 transcription factor in chromosome doubling of a plant and a transgenic plant cultivation method are provided. The gene sequence of the OBF1 transcription factor is shown in SEQ ID NO: 1; and the plant includes petunias, tomatoes, and tobaccos. An OBF1 gene is introduced into plant cells or tissues, and under treatment with kanamycin, a chromosome-doubled transgenic cell line or plant is obtained; and the transgenic plant grows vigorously and exhibits resistance to biotic stress. After treatment according to the present invention, plants still easily self-pollinate, thus enabling efficient separation of doubled offspring plants, and the doubling trait can be stably inherited. This technology overcomes the plant teratogenicity and environmental safety problems faced by the use of prior technologies to double chromosomes in plants, having great significance in cultivating chromosome-doubled plant varieties and being suitable for use in the cultivation and identification of chromosome-doubled varieties.

8 Claims, 16 Drawing Sheets
Specification includes a Sequence Listing.

WT

WT+2-6

WT+100-2

WT

WT+OX21

```
                             SEQUENCE LISTING

Sequence total quantity: 8
SEQ ID NO: 1            moltype = DNA   length = 486
FEATURE                 Location/Qualifiers
source                  1..486
                        mol_type = other DNA
                        organism = synthetic construct
SEQUENCE: 1
atggcatctt ctagtggaaa ttcatcaggt tcaatgggtt cagaagaaga tatgcaagga    60
ttaatgatgg tggatgaaag gaaaagaaag agaatgcaat caaatcgtga atcagcaaga   120
agatcaagaa tgcgaaagca aaaacatctt gatgatttaa ttggacaagt gtcacaacta   180
aagaaggaaa atggacacat acttagtacc atcaacatga ctacaacaca atatgctaat   240
gttgaagctg aaaattctgt tttaagagca caaatgatga aattaagtca aaggttgcaa   300
tctcttaatg acatcctcaa ttacatcaat tccaacaaca acaacaacaa caacaacgtt   360
gttaatacta ctaatggaat atttgattt gaaactactg ctcatcagca acaagaggaa   420
ccatggaact tgatgtattt aaatcagcca attatggctt cagctgatat gttctatcag   480
tattga                                                              486

SEQ ID NO: 2            moltype = AA    length = 161
FEATURE                 Location/Qualifiers
source                  1..161
                        mol_type = protein
                        organism = synthetic construct
SEQUENCE: 2
MASSSGNSSG SMGSEEDMQG LMMVDERKRK RMQSNRESAR RSRMRKQKHL DDLIGQVSQL    60
KKENGHILST INMTTTQYAN VEAENSVLRA QMMELSQRLQ SLNDILNYIN SNNNNNNNNV   120
VNTTNGIFDF ETTAHQQQEE PWNLMYLNQP IMASADMFYQ Y                       161

SEQ ID NO: 3            moltype = DNA   length = 28
FEATURE                 Location/Qualifiers
source                  1..28
                        mol_type = other DNA
                        organism = synthetic construct
SEQUENCE: 3
atctcgagat ggcatcttct agtggaaa                                       28

SEQ ID NO: 4            moltype = DNA   length = 28
FEATURE                 Location/Qualifiers
source                  1..28
                        mol_type = other DNA
                        organism = synthetic construct
SEQUENCE: 4
atgagctctc aatactgata gaacatat                                       28

SEQ ID NO: 5            moltype = DNA   length = 20
FEATURE                 Location/Qualifiers
source                  1..20
                        mol_type = other DNA
                        organism = synthetic construct
SEQUENCE: 5
aagatggatt gcacgcaggt                                                20

SEQ ID NO: 6            moltype = DNA   length = 20
FEATURE                 Location/Qualifiers
source                  1..20
                        mol_type = other DNA
                        organism = synthetic construct
SEQUENCE: 6
agcttcaaag cagatccaag                                                20

SEQ ID NO: 7            moltype = DNA   length = 37
FEATURE                 Location/Qualifiers
source                  1..37
                        mol_type = other DNA
                        organism = synthetic construct
SEQUENCE: 7
atactagtgg cgcgccagtg aaatccttcg ttctggt                             37

SEQ ID NO: 8            moltype = DNA   length = 37
FEATURE                 Location/Qualifiers
source                  1..37
```

```
                mol_type = other DNA
                organism = synthetic construct
SEQUENCE: 8
atggatccat ttaaatcatt gaacctgatg aatttcc                    37
```

APPLICATION OF OBF1 TRANSCRIPTION FACTOR IN CHROMOSOME DOUBLING OF PLANT AND TRANSGENIC PLANT CULTIVATION METHOD

CROSS REFERENCE TO THE RELATED APPLICATIONS

This application is a continuation application of International Application No. PCT/CN2023/125620, filed on Oct. 20, 2023, which is based upon and claims priority to Chinese Patent Application No. 202311335642.2, filed on Oct. 16, 2023, the entire contents of which are incorporated herein by reference.

SEQUENCE LISTING

The instant application contains a Sequence Listing which has been submitted in XML format via EFS-Web and is hereby incorporated by reference in its entirety. Said XML copy is named GBBTZX002-PKG_Sequence_Listing.xml, created on 02/27/2024, and is 8,625 bytes in size.

TECHNICAL FIELD

The present invention relates to the field of genetic engineering technologies and genetics, in particular to an application of an OBF1 transcription factor in chromosome doubling of a plant and a transgenic plant cultivation method.

BACKGROUND

The ploidy change of plants is an important research topic in plant biology, plant biotechnology, and plant breeding. Compared with diploids, homologous polyploids are characterized by enlargement of certain organs or increased content of metabolites, providing excellent breeding and utilization value for crops aimed at harvesting nutrient organs and for asexually propagated crops. Therefore, chromosome doubling has significant theoretical research and commercial value.

Currently, chemical agents and physical treatment methods are often used to induce chromosome doubling in plant cells. For example, colchicine, nitrous oxide gas, heat treatment, methylaminopropyl phosphorus, trifluralin, oryzanol, and propionamide have been used to obtain a variety of plant chromosome-doubled strains. In addition, 8-hydroxyquinoline, 1-bromonaphthalene, a mixed solution of 1-bromonaphthalene and colchicine, and a mixed solution of colchicine and 8-hydroxyquinoline can also be used for chromosome doubling in plants.

Among the many methods mentioned above, the most commonly used at present is to use colchicine as a doubling agent. However, the doubling effect of colchicine on plants makes it difficult to meet the needs of the above research. The main problem is that colchicine can cause great damage to treated plant materials, often leading to abnormal plant growth, deformity, and even death of the treated materials, and frequently causing the plants to fail to self-pollinate. In addition, colchicine is highly toxic and has greater toxicity and potential carcinogenic effects on mammals, including humans, which increases the risk of harm to the health of operators and environmental safety. Another substance commonly used for chromosome doubling is nitrous oxide gas, however, nitrous oxide gas is less effective than colchicine, which limits the application of nitrous oxide gas in chromosome doubling technologies. Therefore, research and development of a new method for chromosome doubling in plants has become one of the technical problems faced by researchers in this field.

SUMMARY

A first objective of the present invention is to provide an application of an OBF1 transcription factor in chromosome doubling of a plant.

Specifically, the present invention provides the following technical solution:

an application of an OBF1 transcription factor in chromosome doubling of a plant, where the gene sequence of the OBF1 transcription factor is shown in SEQ ID NO: 1, and the protein sequence of the OBF1 transcription factor is shown in SEQ ID NO: 2.

Specifically, under treatment with kanamycin, an OBF1 gene is introduced into initial plant cells or tissues, and a chromosome-doubled transgenic cell line or a chromosome-doubled transgenic plant is obtained.

Specifically, a recombinant expression vector containing an OBF1 ORF fragment can be constructed using an existing plant expression vector, and the vector is a plant expression vector carrying kanamycin resistance.

When the constructed OBF1 recombinant plant expression vector is used, any one of an enhanced promoter, or a constitutive promoter, or a chemically induced promoter can be added before the transcription initiation nucleotide of the vector. These promoters can be used alone or in combination with other plant promoters In order to facilitate identification and screening of transgenic plant cells or plants, all plant expression vectors can be modified by adding a gene (such as the GUS gene or the luciferase gene) that can be expressed in plants and encodes enzymes capable of producing color changes or luminous compounds. Transformed plants can also be screened directly depending on whether a chromosome is doubled, without adding a selective marker gene.

The recombinant expression vector is specifically obtained by inserting deoxynucleotides at sites 1 to 486 from the 5' end of the sequence shown in SEQ ID NO: 1 into the multiple cloning site of the plant expression vector, thus obtaining an OBF1 over-expression vector.

An expression vector carrying an encoding gene can transform cells or tissues through biological methods such as Ti plasmids, Ri plasmids, plant virus vectors, direct DNA transformation, microinjection, conductance, and *agrobacterium*-mediated transformation, and the transformed plant tissues can be cultivated into plants.

A second objective of the present invention is to provide a plant breeding method.

The Method can Include the Following Technical Solutions:
(1) At least first and second parent plants are hybridized to produce a heterozygous plant containing the selected genetic background.
(2) Diploid offspring plants derived from the hybrid plants are produced.

In implementations of the present invention, an initial plant can be further defined as a diploid plant, whereas a T1-generation plant is a doubled diploid plant. A starting plant can be an interspecific hybrid plant or an intraspecific hybrid plant. This heterozygous plant can be a member of a heterologous plant population, such as an open-pollinated plant population. The heterozygous plant can be obtained from any heterozygous materials, including native varieties, complexes of different genetic backgrounds, and other plant collections.

The starting plant used in the present invention may be a dicotyledonous plant, where examples of the dicotyledonous plant include tomatoes, tobaccos, and petunias.

(3) In a development stage of the initial plant forming pollens, cotyledons, hypocotyls and young leaves, a plant transformed by an OBF1 over-expressing vector is grown on medium with kanamycin, and the plant includes the pollens, the cotyledons, the hypocotyls, and young leaves of the initial plant.

In embodiments of the present invention, the initial plant is treated with kanamycin at selected concentrations (pressures). The selected pressure of first-generation kanamycin is 100 mg/g and can also be approximately 100 mg/g to approximately 150 mg/g. In further implementations of the present invention, the plant is treated with kanamycin for a period of time, the time period selected may be the time required from callusing to rooting, and specific treatment durations vary depending on different species.

In embodiments of the present invention, T0-generation seeds are treated with kanamycin at selected concentrations (pressures). The selected pressure of second-generation kanamycin is 25 mg/g and can also be approximately 15 mg/g to approximately 30 mg/g. In further implementations of the present invention, the seeds are treated with kanamycin for a period of time, the time period selected may be the time required from seeds to sprouting, and specific treatment durations vary depending on different species.

(4) T0-generation plants are self-pollinated to obtain homozygous strains, and the homozygous strains have characteristics of organ enlargement and chromosome doubling.

(5) Doubled diploid offspring plants derived from self-pollination are selected, where the offspring plants have a desired genetic background, and chromosome doubling trait in plants can be inherited stably.

(6) Self-pollination of the starting plant and doubled plants can be performed by any method, including natural self-pollination and artificial self-pollination.

The OBF1 gene provided by the present invention is introduced into plant cells or tissues by using any vector that carries kanamycin resistance and can guide the expression of exogenous genes in plants, and under treatment with a certain concentration of kanamycin, chromosome-doubled transgenic cell lines and transgenic plants can be efficiently obtained. The chromosome doubling of plants can specifically mean that plant bodies, plant organs, plant tissues, or cultured plant cells have sizes increased and chromosomes doubled.

The research results show that when the OBF1 gene of the present invention is transferred into a *petunia*, tomato, or tobaccos and the gene is over-expressed in plants under a certain pressure of kanamycin selected, the transgenic plants show leaves, flowers, seeds, and stems increased in size, and cells increased in size; The transgenic plants can easily self-pollinate, and the chromosome doubling trait can be inherited stably.

Further, the transgenic plants have resistance to the gray mold pathogen. In the pathogen infection experiments, T2-generation plants with transgenic OBF1 genes show resistance to pathogen infection, thus indicating that the OBF1 gene and encoded proteins thereof provided by the present invention can significantly improve the disease resistance of the plants.

Specifically, the present invention provides an OBF1 transgenic plant cultivation method, including the following steps:
(1) performing primer design on an ORF region of an OBF1 gene to obtain primers OE_F1 and OE_R1, where sequences used for OBF1 ORF fragment amplification are shown in SEQ ID NO: 3 and SEQ ID NO: 4;

```
OE_F1:
ATCTCGAGATGGCATCTTCTAGTGGAAA;

OE_R1:
ATGAGCTCTCAATACTGATAGAACATAT;
```

(2) performing PCR amplification with the primers, performing cloning to obtain an OBF1 fragment, and constructing the fragment with the over-expressed OBF1 gene into a plant expression vector carrying kanamycin resistance to obtain recombinant plasmids;
(3) mixing 1 μL of the recombinant plasmids with 100 μL of *agrobacterium* competent cells, and transferring into a 2510 V electroporation cuvette, performing electroporation transformation by an electroporation device with a voltage of 2510 V, after transformation, coating onto a Luria-Bertani (LB) solid culture medium containing antibiotics, and performing screening to obtain *agrobacterium* with the recombinant plasmids;
(4) performing enlarged culture on the *agrobacterium* carrying the recombinant plasmids, and infecting tender tissues of an initial plant with the *agrobacterium*, where the tender tissues include cotyledons, hypocotyls, young leaves, and pollens;
(5) performing differentiation culture on the tender tissues on a culture medium with kanamycin at selected pressure to obtain callus, and performing regeneration and screening culture to obtain new buds; scissoring and taking the new buds; continuing to make seedlings strong and performing rooting culture to obtain seedlings; and transferring into soil for further culture;
(6) after seedlings subjected to further culture grow stably, taking leaf samples, extracting DNA by a hexadecyl trimethyl ammonium bromide (CTAB) method; performing PCR amplification by taking the extracted DNA as a template and using primer pairs NPTII_F and NPTII_R; and identifying that an OBF1 gene sequence is transferred into the plant to obtain a T0-generation transgenic strain;
where sequences of NPTII_F and NPTII_R are shown in SEQ ID NO: 5 and SEQ ID NO: 6;

```
NPTII_F:
AAGATGGATTGCACGCAGGT;

NPTII_R:
AGCTTCAAAGCAGATCCAAG;
```

(7) after the T0-generation transgenic strain flowers, performing self-pollination to obtain T1-generation seeds, and performing further screening by a second-generation kanamycin resistant culture medium to obtain homozygous chromosome-doubled offspring, that is, T2-generation transgenic plants; and
(8) performing further culture on the T2-generation transgenic plants and performing self-pollination, where T3-generation plants are identified to inherit the chromosome doubling trait stably.

Compared with the prior art, the present invention has the following beneficial effects:

The research results of the present invention show that after tender tissues of the petunias, with transformed OBF1 genes, are treated with kanamycin, leaves, petals, styles, stigmas, anthers, seeds, stems, and cells of transgenic plants are increased, and these characteristics are related to chromosome doubling. Through flow cytometer and cytology experiments, it is confirmed that under a certain kanamycin screening pressure, OBF1 over-expression causes chromosome doubling in plants. In addition to enlarged organs, plants with double chromosomes grow normally and strongly and can easily self-pollinate, so that the trait can be stably inherited. To further validate this phenotype, after tender tissues of tomatoes and tobaccos, with transformed OBF1 genes, are treated with kanamycin, a chromosome doubling phenomenon is also observed in transgenic tomatoes and tobaccos. Further research confirms that pure line offspring selected through self-pollination stably inherit the chromosome doubling trait. The development of pure line chromosome-doubled plants has great significance in the development of commercial varieties of seed crops, flowers, fruit trees, and vegetables, and homozygous chromosome-doubled plants can be directly used as commercial varieties.

Chromosome-doubled transgenic plants show resistance to biotic stresses, such as resistance to the gray mold pathogen. The present invention has important theoretical and practical significance in cultivating plant varieties resistant to biotic stresses, and can be used for cultivation and identification of disease-resistant plant varieties.

BRIEF DESCRIPTION OF THE DRAWINGS

FIG. 2A shows a transverse section of a main stem, and FIG. 2B shows a diameter of the main stem;

DETAILED DESCRIPTION OF THE EMBODIMENTS

Figure 1:
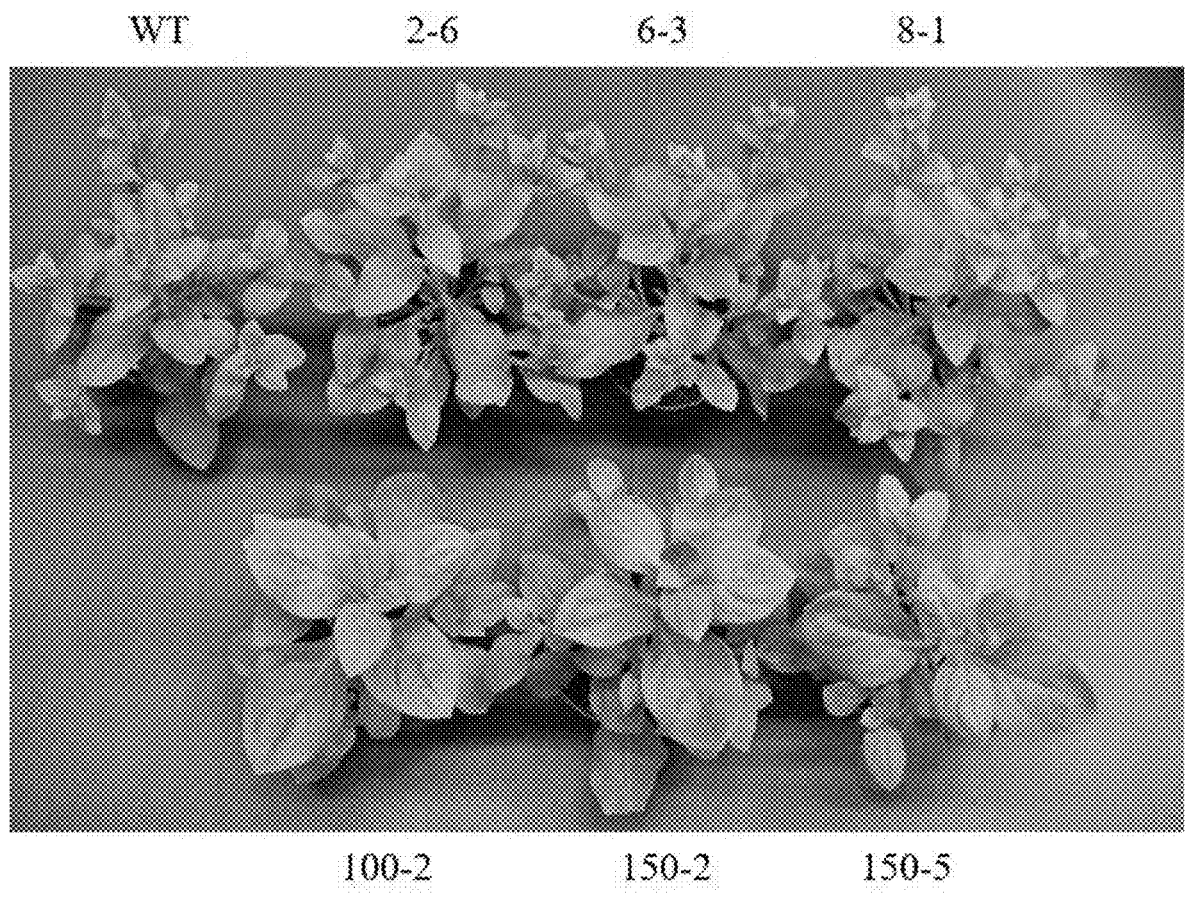
FIG. 1 shows a phenotype of a *petunia* plant over-expressing and gene-silencing an OBF1 transcription factor, where over-expressed plants are named 100-2, 150-2, 150-5; gene-silenced plants are named 2-6, 6-3, 8-1; a wild type is WT.
Figure 2A:
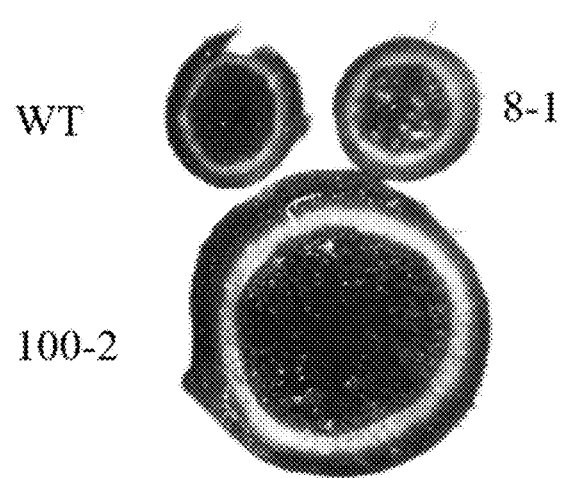
FIGS. 2A-2B show that a diameter of a *petunia* stem is increased through over-expression of OBF1, where
Figure 2B:
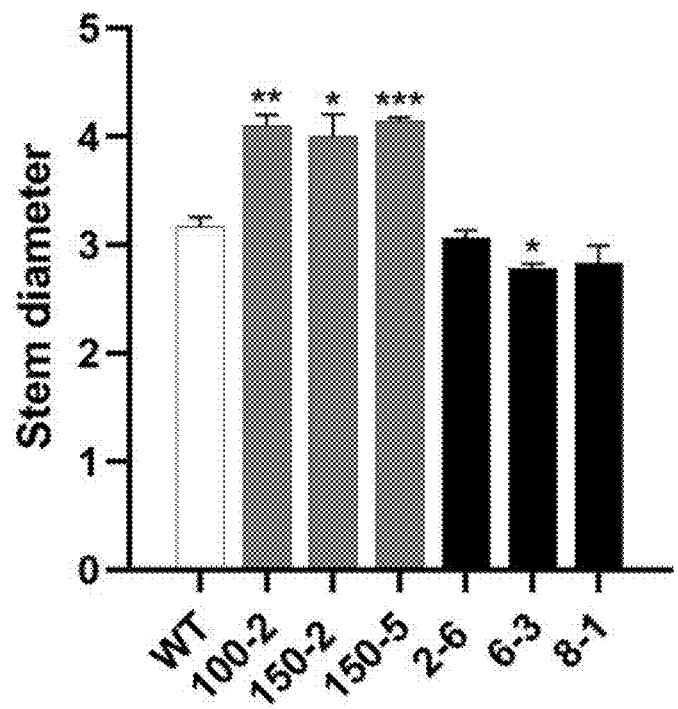
Figure 3:
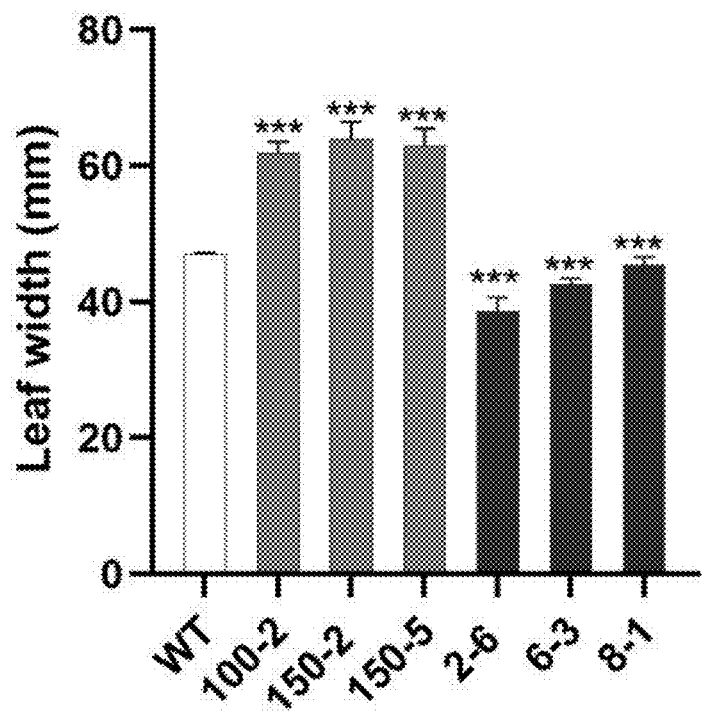
FIG. 3 shows that a width of a *petunia* leaf (the 6th leaf) is increased through over-expression of an OBF1 gene.
Figure 4A:
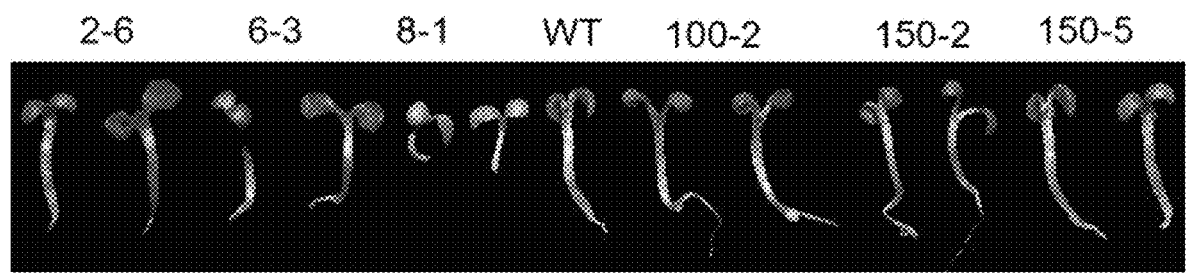
FIGS. 4A-4B show a photo (FIG. 4A) and a histogram (FIG. 4B) of a length of a *petunia* hypocotyl, increased through over-expression of OBF1.
Figure 4B:
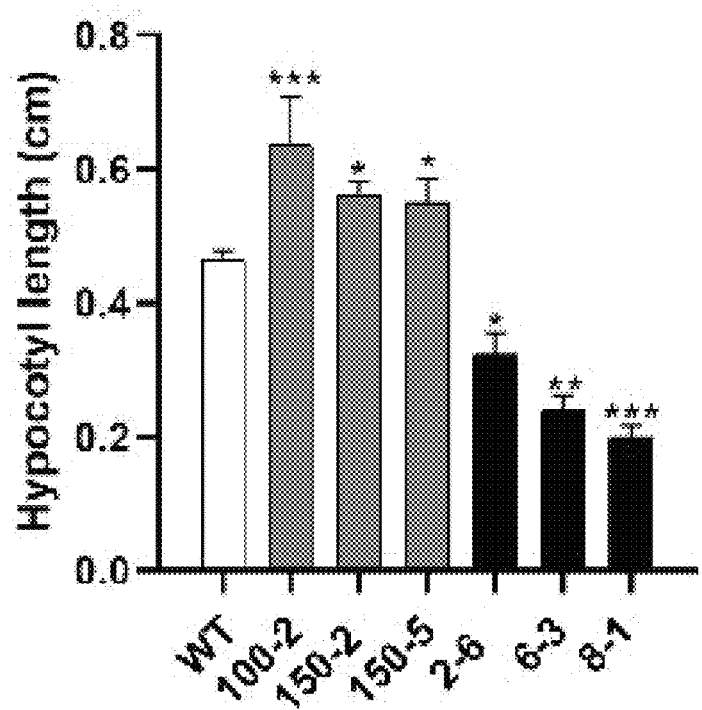
Figure 5A:
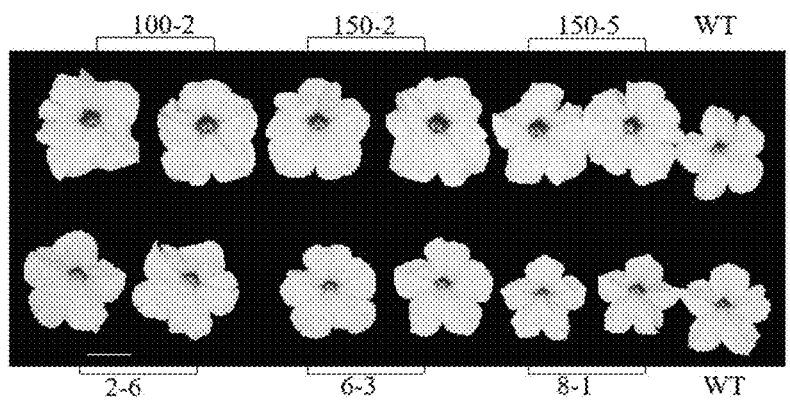
FIGS. 5A-5B show a photo (FIG. 5A) and a histogram (FIG. 5B) of a size of a *petunia* petal, increased through over-expression of OBF1.
Figure 5B:
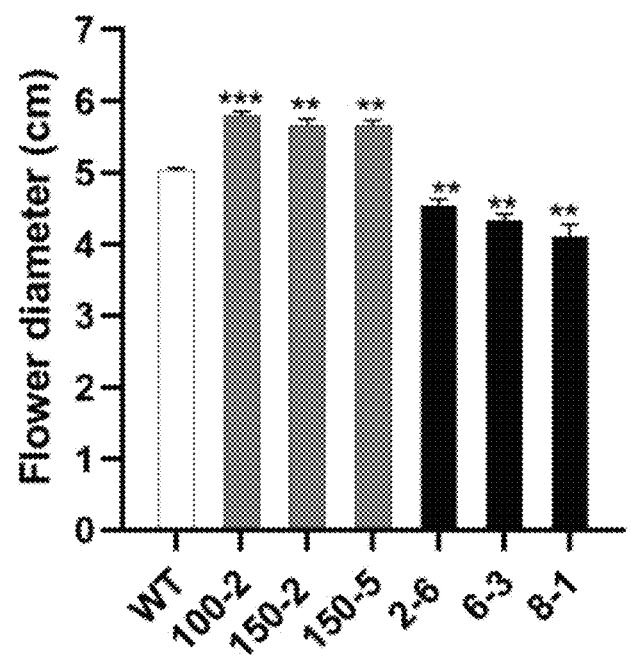
Figure 6A:
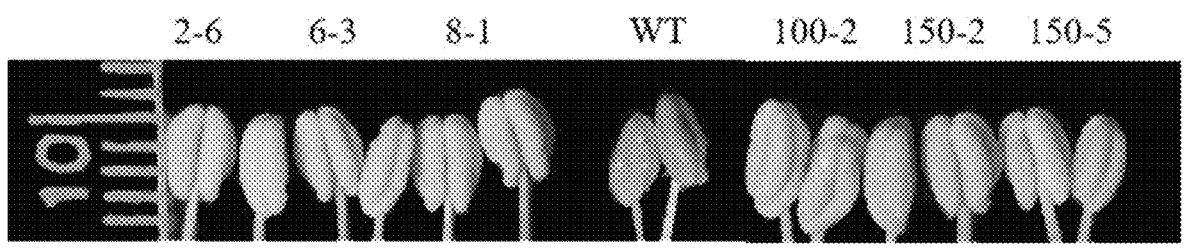
FIGS. 6A-6C show a photo (FIG. 6A) and histograms (FIG. 6B and FIG. 6C) of a size of *petunia* anthers, increased through over-expression of OBF1.
Figure 6B:
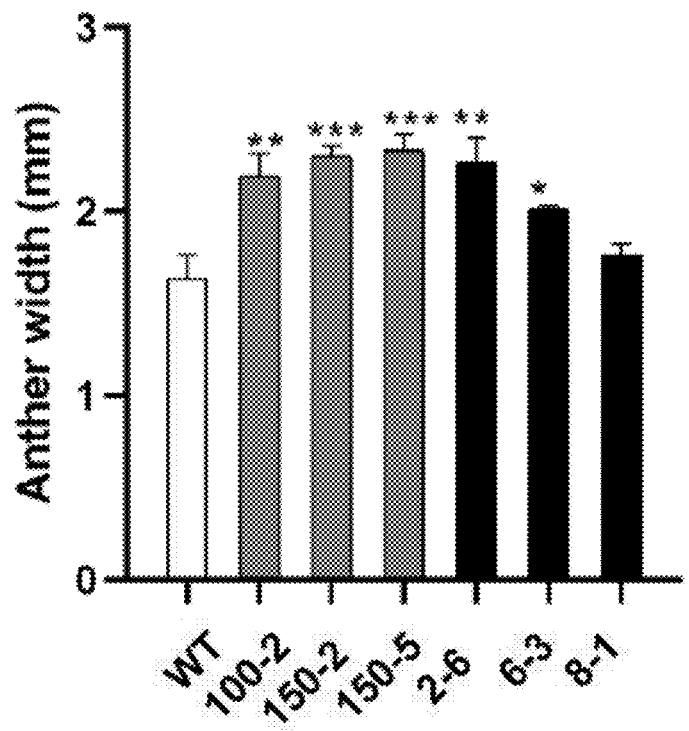
Figure 6C:
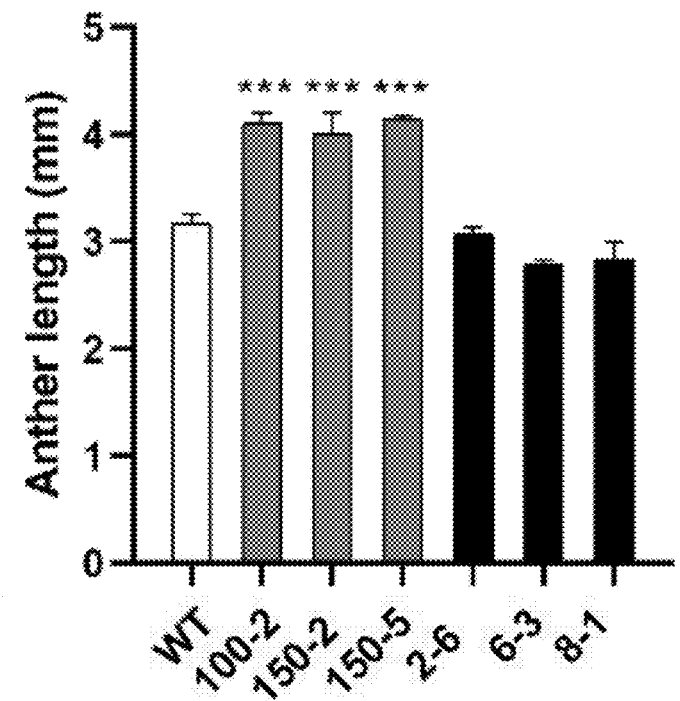
Figure 7A:
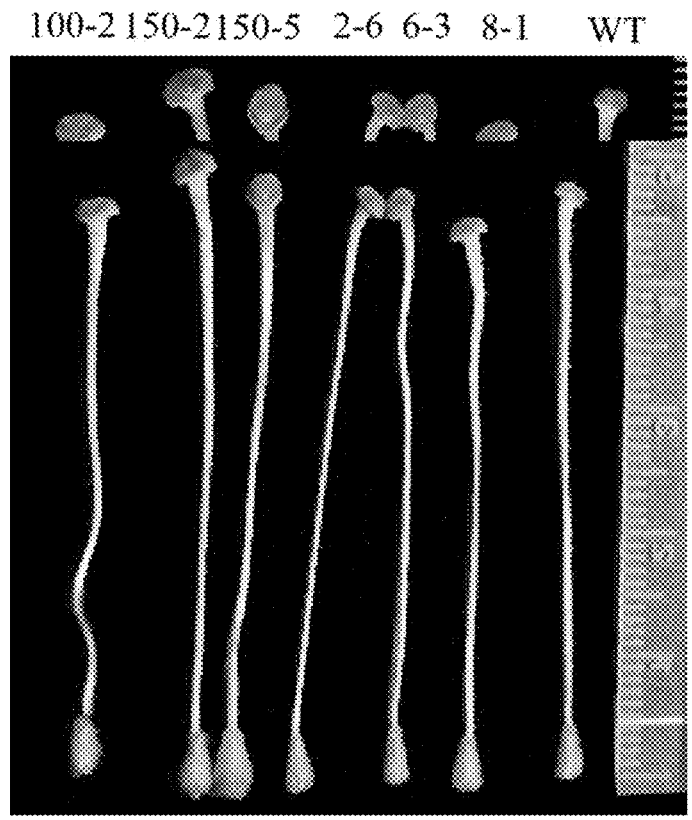
FIGS. 7A-7B show a photo (FIG. 7A) and a histogram (FIG. 7B) of a size of a *petunia* stigma, increased through over-expression of OBF1.
Figure 7B:
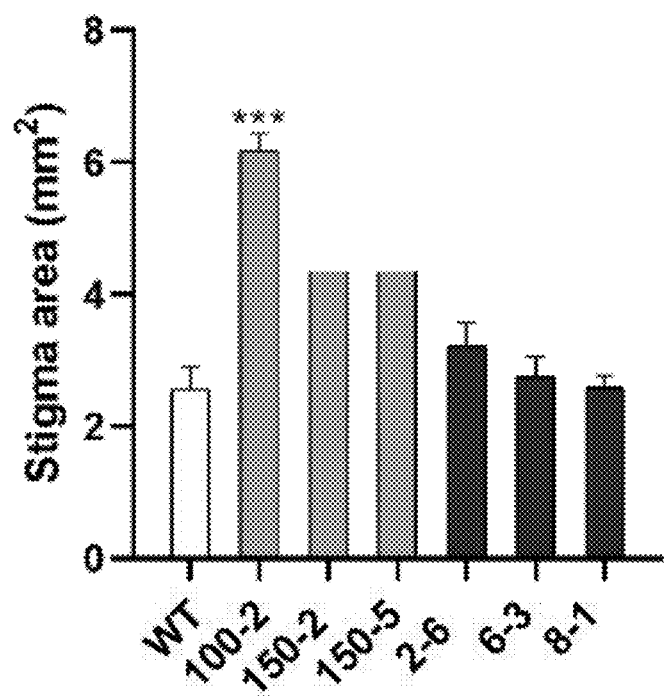
Figure 8A:
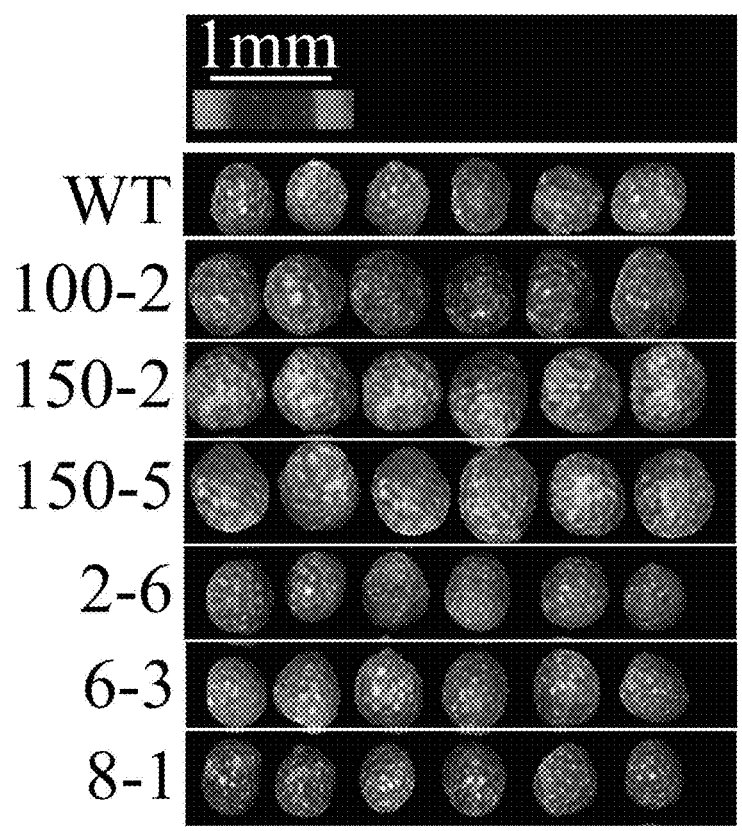
FIGS. 8A-8C show a photo (FIG. 8A) and histograms (FIG. 8B and FIG. 8C) of the size and weight of *petunia* seeds, increased through over-expression of OBF1.
Figure 8B:
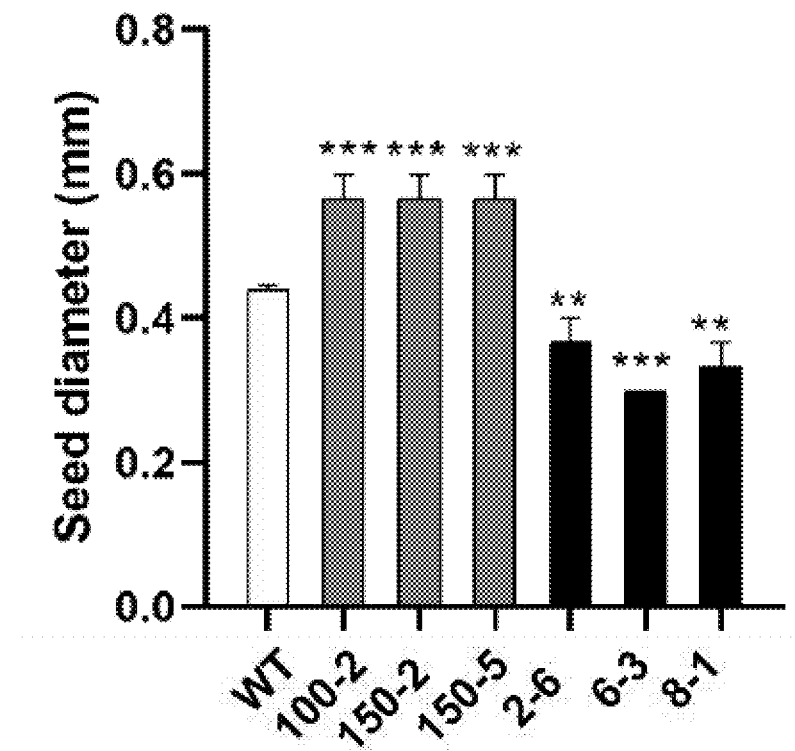
Figure 8C:
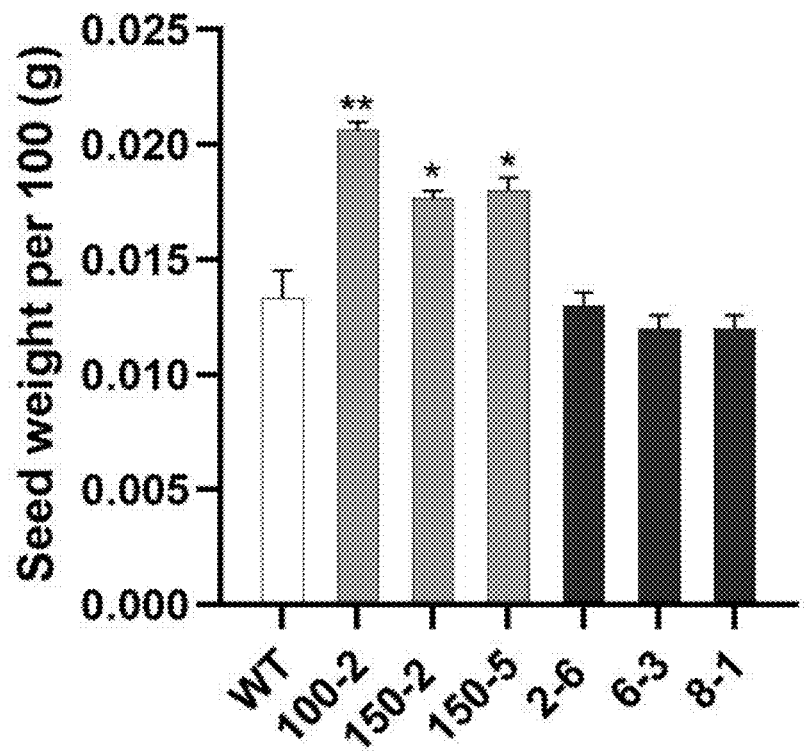

An explicit and complete description of the technical solution in embodiments of the present invention is given below in conjunction with the accompanying drawings in embodiments of the present invention. Apparently, the described embodiments are just part of the embodiments of the present invention and not all the embodiments. Based on the embodiments in the present invention, all other embodiments obtained by those of ordinary skill in the art without making creative labor fall within the scope of protection of the present invention.

Embodiment 1 Culture Method for Inducing Chromosome Doubling and Resistance of Petunias (1) Primer design was performed on an ORF region of an OBF1 gene, sequences of primers for over-expression were as follows (SEQ ID NO: 3 and SEQ ID NO: 4):

```
OE_F1:
ATCTCGAGATGGCATCTTCTAGTGGAAA;

OE_R1:
ATGAGCTCTCAATACTGATAGAACATAT.
``` sequences of primers for gene-silencing were as follows (SEQ ID NO: 7 and SEQ ID NO: 8):

```
rnai-F1:
ATACTAGTGGCGCGCCAGTGAAATCCTTCGTTCTGGT rnai-R1:
ATGGATCCATTTAAATCATTGAACCTGATGAATTTCC.
```

(2) PCR amplification was performed with the above primers, and cloning was performed to obtain OBF1 gene fragments; a fragment with a silenced OBF1 gene was constructed into a pGSA1285 vector; a fragment with an over-expressed OBF1 gene was constructed into a pGSA1403 vector to obtain recombinant plasmids.

(3) 1 μL of the recombinant plasmids and 100 μL of *agrobacterium* competent cells were mixed and transferred into an electroporation cuvette, electroporation transformation was performed by an electroporation device with a voltage of 2510 V, after transformation, the transformed mixture was coated onto an LB solid culture medium containing chloramphenicol, and screening was performed to obtain *agrobacterium* with the recombinant plasmids.

(4) Wild-type *petunia* seeds subjected to surface disinfection by sodium hypochlorite were germinated in a ½ MS culture medium and cultured in a culture room for 4 weeks.
(5) Young leaves were scissored and taken, and the leaves were cut into squares about 5 mm in length and width, respectively, with a scalpel on a clean bench.
(6) Activation and enlarged culture were performed on the *agrobacterium* carrying the recombinant plasmids in step (3).
(7) The cut leaves in step (5) were placed in bacterial liquid in step (6) and shaken at room temperature at 200 rpm for 15-20 min.
(8) The infected young leaves were transferred to a co-culture culture medium and subjected to dark treatment for two days.
(9) Two days later, the leaves were transferred to a regeneration culture medium with corresponding screening resistance, the culture medium was replaced every two to three weeks, and the leaves waited for differentiation.
(10) Differentiated new buds were transferred to a new screening culture medium, and then sequentially transferred to a rooting culture medium.

Culture conditions of a tissue culture room were: temperature 22-24° C., illumination/darkness: 16 h/8 h, light intensity 1500-2000 1x.

Concentration settings of kanamycin and compositions of culture media are shown in Table 1;

TABLE 1

| Basic culture medium | 6-BA (mg/mL) | IBA (mg/mL) | IAA (mg/mL) | AS (mg/mL) | Carbenicillin mg/mL | Kanamycin mg/mL | Remark |
|---|---|---|---|---|---|---|---|
| MS | 0.25 | — | 0.025 | 1 | — | — | Co-culture culture medium |
| MS | 0.25 | — | 0.025 | 1 | 500 | 50 | Screening culture medium 1 |
| MS | 0.25 | — | 0.025 | 1 | 500 | 100 | Screening culture medium 2 |
| MS | 0.25 | — | 0.025 | 1 | 500 | 150 | Screening culture medium 3 |
| 1/2MS | — | 0.1 | — | — | 250 | 50 | Rooting culture medium |

(11) After seedlings subjected to further culture grew stably, leaf samples were taken, and DNA was extracted by a CTAB method; PCR amplification was performed by taking extracted DNA as a template and using primer pairs NPTII_F and NPTII_R (as shown in SEQ ID NO: 5 and SEQ ID NO: 6), and an OBF1 gene sequence was identified to be transferred into the plant;

```
NPTII_F:
AAGATGGATTGCACGCAGGT;

NPTII_R:
AGCTTCAAAGCAGATCCAAG.
``` a *petunia* with a transgenic OBF1 gene was named as a T0-generation transgenic strain, and the T0-generation transgenic strain was moved to a solar greenhouse for culture.

(12) FIG. 1 shows phenotypes of *petunia* plants with over-expressed transgenes and silenced genes. The sizes of stems, leaves, hypocotyls, petals, anthers, stigmas, and seeds of different strains of plants were counted, as shown in FIGS. 2A-8C.

Figure 9A:
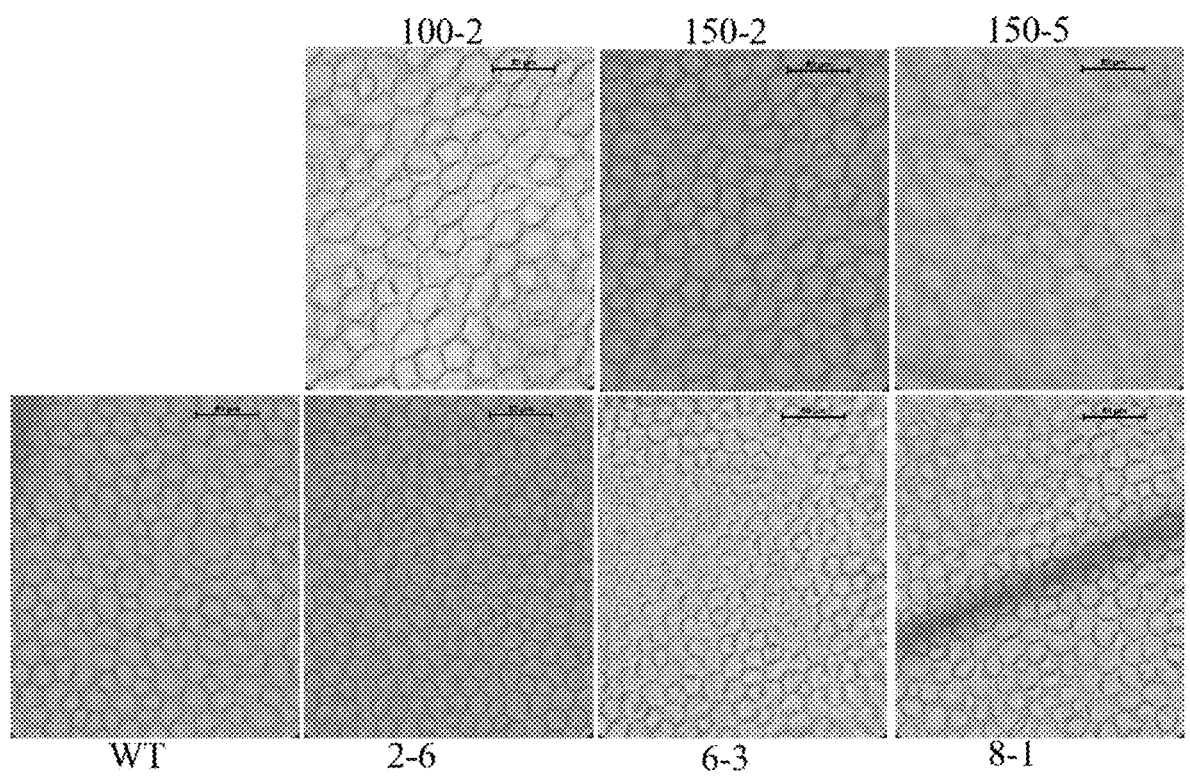
FIGS. 9A-9C show that a size of *petunia* cells is increased through over-expression of OBF1.
Figure 9B:
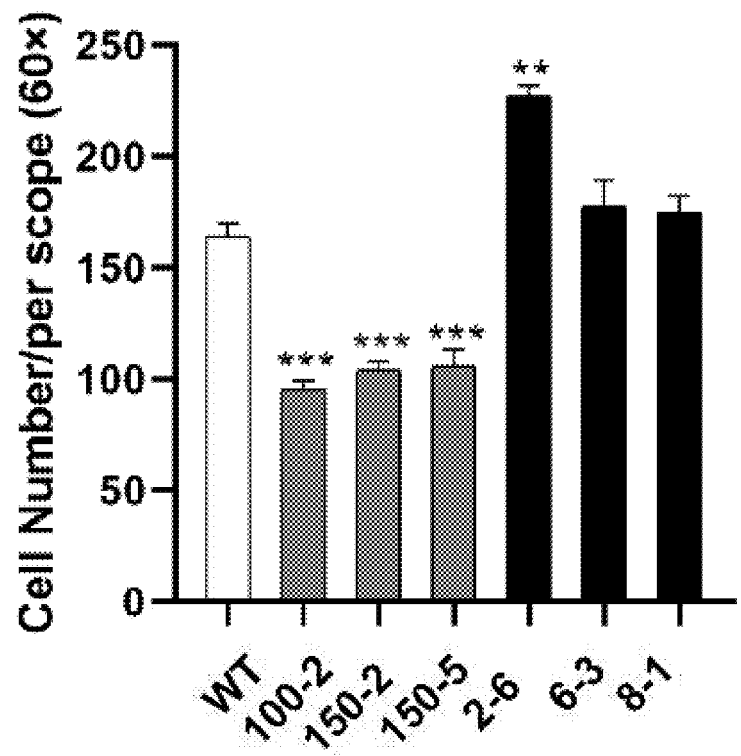
Figure 9C:
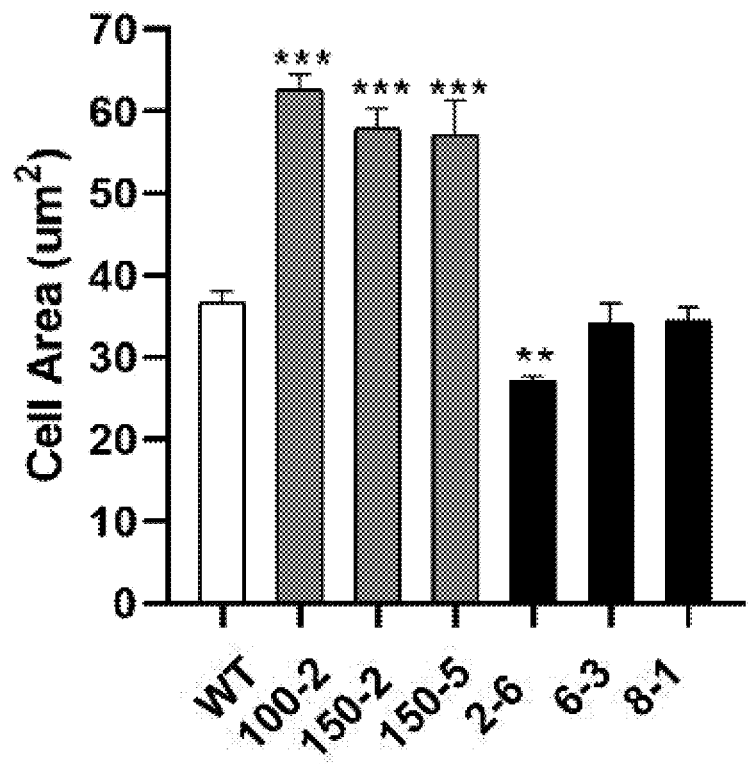

(13) Young leaves of the *petunia* were taken and placed in paraformaldehyde fixative for fixation for 2 h, the fixed leaves were rinsed with deionized water 3 times, and the rinsed leaves were manually torn to obtain leaf epidermis; the leaf epidermis was inverted on an LSM880 type laser scanning confocal microscope (ZEISS) stage, and the cell size of seedling leaves was detected and observed, as shown in FIGS. 9A-9C.

Figure 10A:
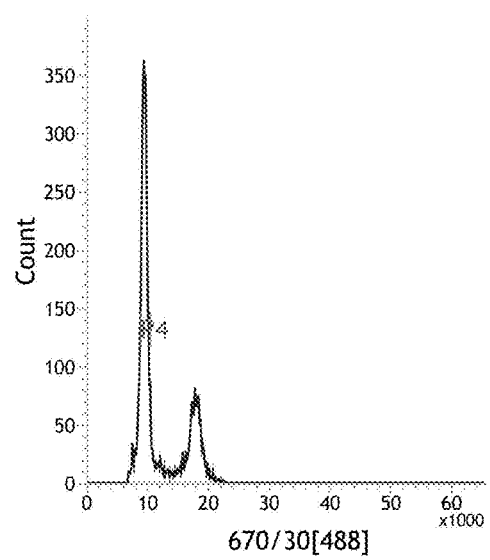
FIGS. 10A-10C show that over-expression of OBF1 leads to chromosome doubling of the petunias as confirmed by a flow cytometer.
Figure 10B:
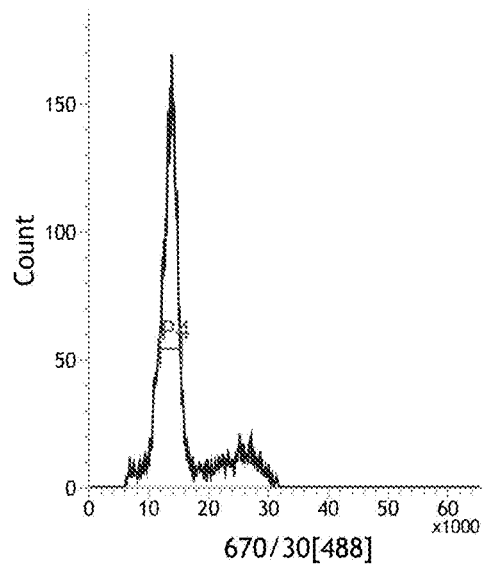
Figure 10C:
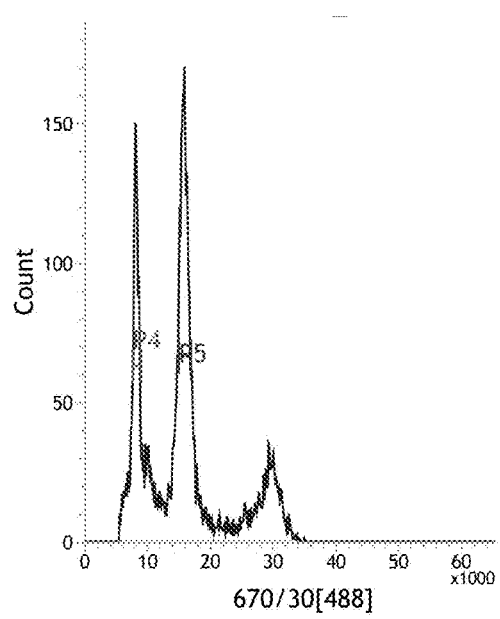

(14) The ploidy of the plants was identified by a flow cytometer, a doubling ratio of the plants under different treatment concentrations of kanamycin was calculated, and the results are shown in Table 2 and FIGS. 10A-10C. As can be seen from FIGS. 10A-10C, the chromosome-doubled plant was detected as a single peak, indicating that the doubled plant was a pure line, no chimera was detected, and the probability of the pure line plant was 100%.

Table 2 Proportion of chromosome-doubled petunias obtained by over-expression of OBF1 treated with different concentrations of kanamycin

| Concentration of kanamycin | Transgenic plant (plant) | Chromosome-doubled plant (plant) | Proportion of chromosome doubling (%) |
|---|---|---|---|
| 50 mg/mL | 27 | 0 | 0 |
| 100 mg/mL | 22 | 14 | 63.6 |
| 150 mg/mL | 6 | 4 | 80 |

Figure 11:
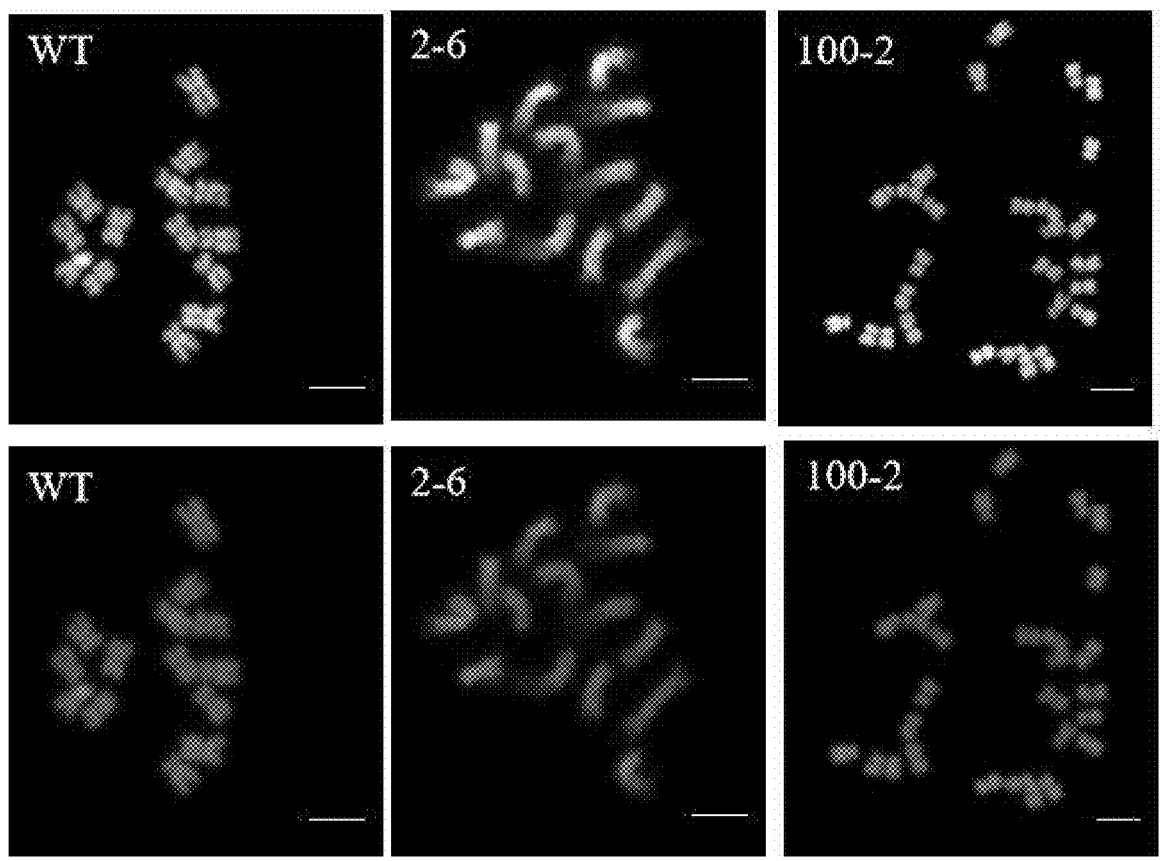
FIG. 11 shows a quantity of chromosomes in a *petunia* root tip with OBF1 over-expressed.

(15) Root tips of the *petunia* were taken, operations of pre-treating, fixing, water bathing, staining, and the like were performed by conventional methods, a small quantity of meristem tissue was cut from the root tips for routine squashing, observation was performed, and the quantity of chromosomes was counted, as shown in FIG. 11.

(16) Before anthers of a T0-generation strain mature and petals open, self-pollination was performed to obtain T1-generation seeds, further culture was performed, and self-pollination was performed to obtain T2-generation seeds. The T2-generation seeds were disinfected with sodium hypochlorite, then the disinfected seeds were sown, and an MS culture medium with a final concentration 25.0 mg·mL$^{-1}$ of kanamycin was used for further screening to observe a separation situation of T2-generation plants. The sprouting rate of the T2-generation seeds on the MS culture medium containing kanamycin was 100%, and the chromosome doubling rate was 100%. The T2-generation seeds were homozygous chromosome-doubled seeds.

(17) Seeds of T2-generation homozygous transgenic strains were selected, sown, and cultured; the plant phenotypes and other agronomic traits were further observed; and detection by a flow cytometer was performed by the method described in step (14) above.

Figure 15:
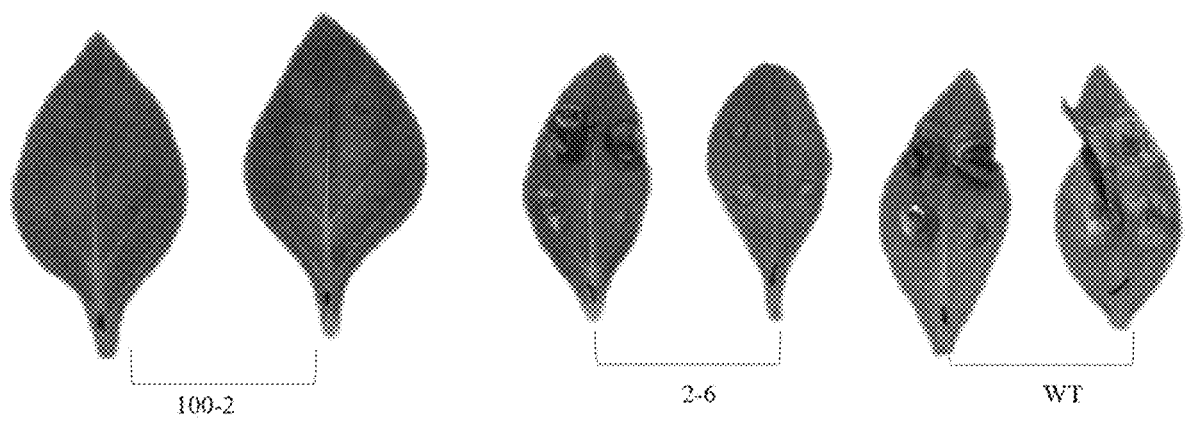
FIG. 15 shows that an ability of the petunias to resist gray mold is enhanced through over-expression of OBF1.

(18) The obtained leaves of the homozygous transgenic strains over-expressing the OBF1 gene were inoculated with the gray mold pathogen. Transgenic plants (100-2) had a stronger disease-resistant phenotype compared with a wild type, as shown in FIG. 15.

Embodiment 2 Culture Method for Inducing Chromosome Doubling of Tomatoes (1) Tomato seeds disinfected with 15% sodium hypochlorite for 15 min and 75% alcohol for 45 s were sown in a culture medium: MS/2+Vitamines R3+Agar 8 g/L, pH 5.7.

(2) About one week later, the seeds grew into seedlings; cotyledons and hypocotyls were cut into small segments, and the small segments were placed on a pre-culture medium for dark culture for 1 day.

(3) Enlarged culture was performed on the *agrobacterium* carrying the recombinant plasmids in step (3) of Embodiment 1.

(4) Pre-cultured explants were mixed with the *agrobacterium* carrying the recombinant plasmids to obtain a mixture, and the mixture was shaken at room temperature at 200 rpm for 30 min; bacterial liquid on the explants was dried with sterilized filter paper, and the dried explants were placed on the pre-culture medium for dark culture for 2 days.

(5) The explants were transferred and placed into the screening culture medium; the photoperiod was 18/6 h, the temperature was 22-25° C., the humidity was 60%, and concentration settings of kanamycin and compositions of culture media were shown in Table 3;

(5) After the seedlings subjected to further culture grew stably, leaf samples were taken, and DNA was extracted by a CTAB method; PCR amplification was performed by taking extracted DNA as a template and using primer pairs NPTII_F and NPTII_R (as shown in SEQ ID NO: 5 and SEQ ID NO: 6), and the plant was identified as a transgenic positive strain.

Figure 12A:
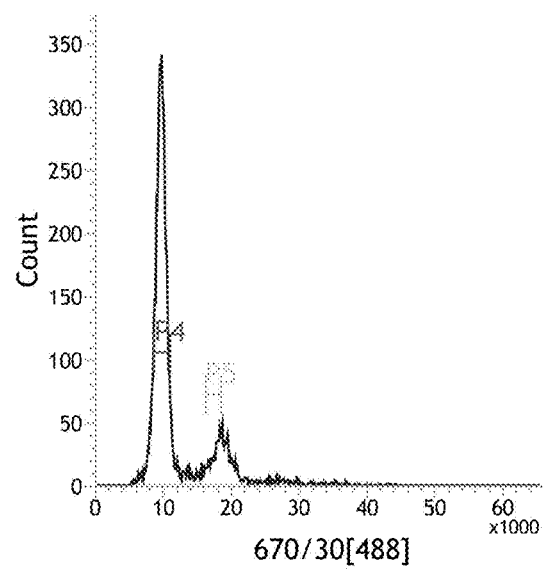
FIGS. 12A-12B show that over-expression of OBF1 leads to chromosome doubling of tomatoes as confirmed by a flow cytometer, where an over-expressed plant is named OX21.
Figure 12B:
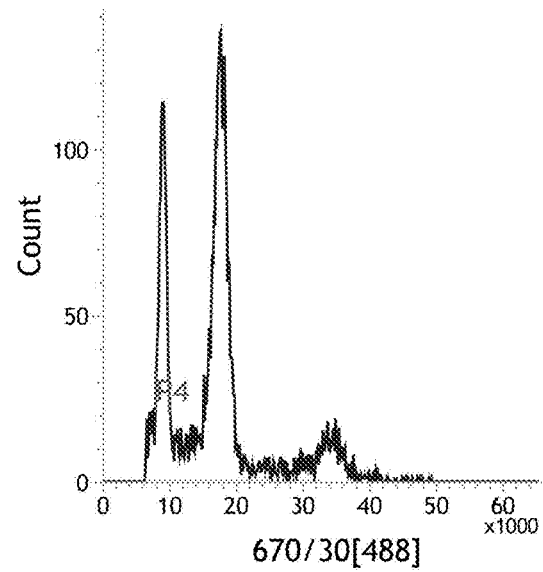

(6) The ploidy of the plants was identified by a flow cytometer, the doubling ratio of the plants under different screening concentrations of kanamycin was calculated, and the results are shown in Table 4 and FIGS. 12A-12B. As can be seen from FIGS. 12A-12B, the chromosome-doubled plant was detected as a single peak, indicating that the doubled plant was a pure line, no chimera was detected, and the probability of the homozygous plant was 100%.

Table 4 Proportion of chromosome-doubled tomatoes obtained by over-expression of OBF1 treated with different concentrations of kanamycin

| Concentration of kanamycin | Transgenic plant (plant) | Chromosome-doubled plant (plant) | Proportion of chromosome doubling (%) |
|---|---|---|---|
| 50 mg/mL | 30 | 0 | 0 |
| 100 mg/mL | 10 | 6 | 60 |

Figure 13:
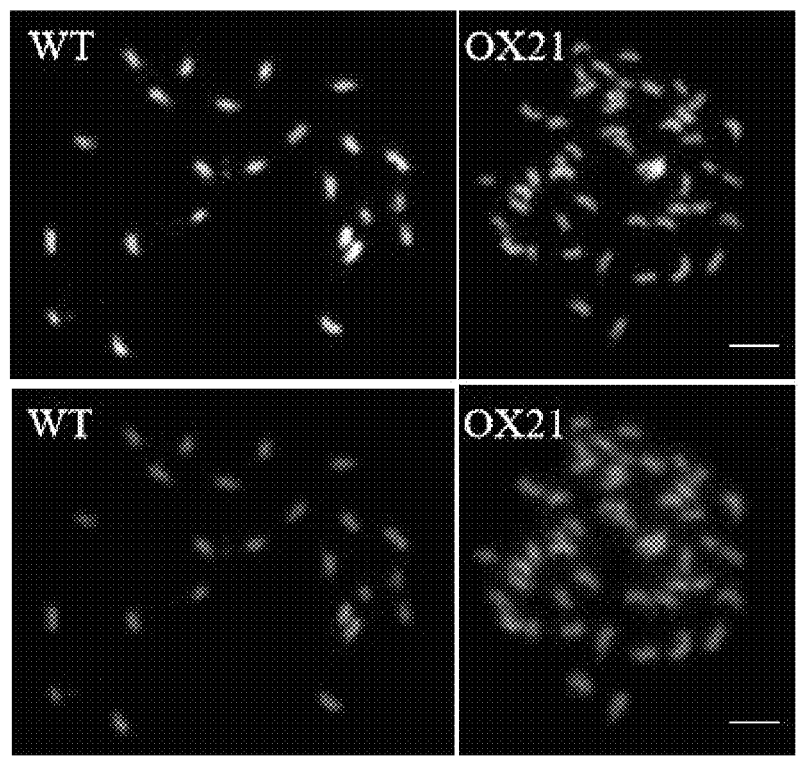
FIG. 13 shows a quantity of chromosomes in a tomato root tip with OBF1 over-expressed.

(7) Root tips of the tomatoes were taken, operations of pre-treating, fixing, water bathing, staining, and the like were performed by conventional methods, a small quantity of meristem tissue was cut from the root tips for routine squashing, observation was performed, and the quantity of chromosomes was counted, as shown in FIG. 13.

Figure 16:
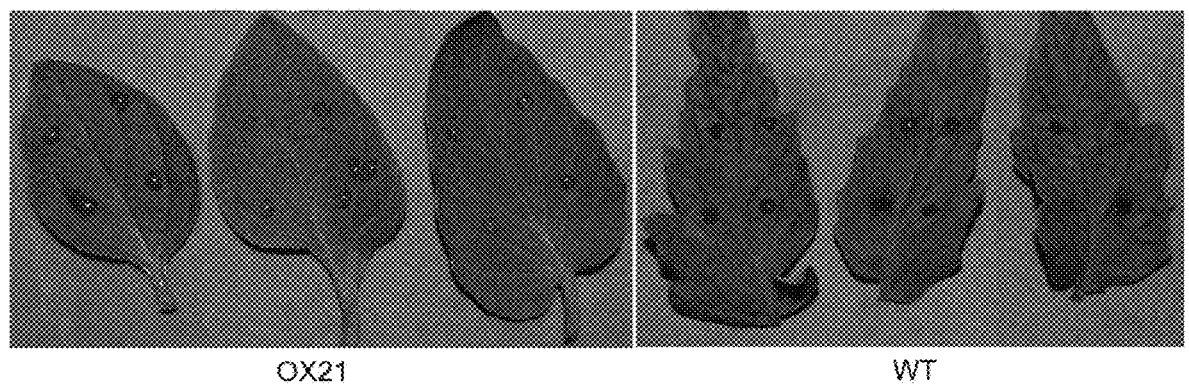
FIG. 16 shows that an ability of the tomatoes to resist gray mold is enhanced through over-expression of OBF1.

(8) The obtained leaves of the homozygous transgenic strains over-expressing the OBF1 gene were inoculated with the gray mold pathogen. Transgenic plants (OX21) had a stronger disease-resistant phenotype compared with a wild type, as shown in FIG. 16.

Embodiment 3 Culture Method for Inducing Chromosome Doubling of Tobaccos (1) Wild-type tobaccos seeds subjected to surface disinfection with 15% sodium hypochlorite for 15 min and 75% alcohol for 45 s were germinated in a ½ MS culture medium, and after cotyledons grew, buds were transplanted into soil and cultured in a culture room for 4-6 weeks.

(2) 10-12 young leaves were scissored and taken, and surface disinfection was performed with 10% sodium

TABLE 3

| Basic culture medium | ZT (mg/mL) | IAA (mg/mL) | AS (mg/mL) | Carbenicillin mg/mL | Kanamycin mg/mL | |
|---|---|---|---|---|---|---|
| MS | 2.0 | 0.2 | — | — | — | Pre-culture medium |
| MS | 2.0 | 0.2 | 200 μL | 500 | 50 | Screening culture medium 1 |
| MS | 2.0 | 0.2 | 200 μL | 500 | 100 | Screening culture medium 2 |
| 1/2 MS | — | 0.1 | — | 300 | 50 | Rooting culture medium |

(4) The culture medium was replaced with a new culture medium every two weeks; after about 2-3 weeks, depending on the growth of regenerated buds on the explants, the explants were transferred to the rooting culture medium.

hypochlorite; the leaves were cut into squares about 5 mm in length and width, respectively, with scissors on a worktable.

(3) Enlarged culture was performed on the *agrobacterium* carrying the recombinant plasmids in step (3) of Embodiment 1; the cut leaves obtained in step (2) were placed in the bacterial liquid for sufficient soaking for 10 min.

(4) The leaves were transferred to a co-culture culture medium and subjected to dark treatment for two days.

(5) The leaves were transferred to a screening culture medium with corresponding screening resistance; the culture medium was replaced every two to three weeks, and the leaves waited for differentiation.

Concentration settings of kanamycin and compositions of culture media are shown in Table 5:

TABLE 5

| Basic culture medium | NAA (mg/mL) | BA (mg/mL) | IAA (mg/mL) | IBA (mg/mL) | Carbenicillin mg/mL | AS (mg/mL) | Kanamycin mg/mL | Remark |
|---|---|---|---|---|---|---|---|---|
| MS | — | 0.25 | 0.025 | — | — | 1 | — | Co-culture medium |
| MS | 0.1 | 2 | — | — | 500 | 200 μL | 50 | Screening culture medium 1 |
| MS | 0.1 | 2 | — | — | 500 | 200 μL | 100 | Screening culture medium 2 |
| 1/2MS | — | — | — | 0.1 | 250 | — | 50 | Rooting culture medium |

(6) Culture conditions: the photoperiod was 18/6 h, the temperature was 25° C., and the humidity was 60%; the culture medium was replaced with a new culture medium every two weeks; after about 2-3 weeks, depending on the growth of regenerated buds on the explants, the explants were transferred to the rooting culture medium.

(7) After seedlings subjected to further culture grew stably, leaf samples were taken, DNA was extracted by a CTAB method; PCR amplification was performed by taking extracted DNA as a template and using primer pairs NPTII_F and NPTII_R (as shown in SEQ ID NO: 5 and SEQ ID NO: 6), and the plant was identified as a positive transgenic strain.

Figure 14A:
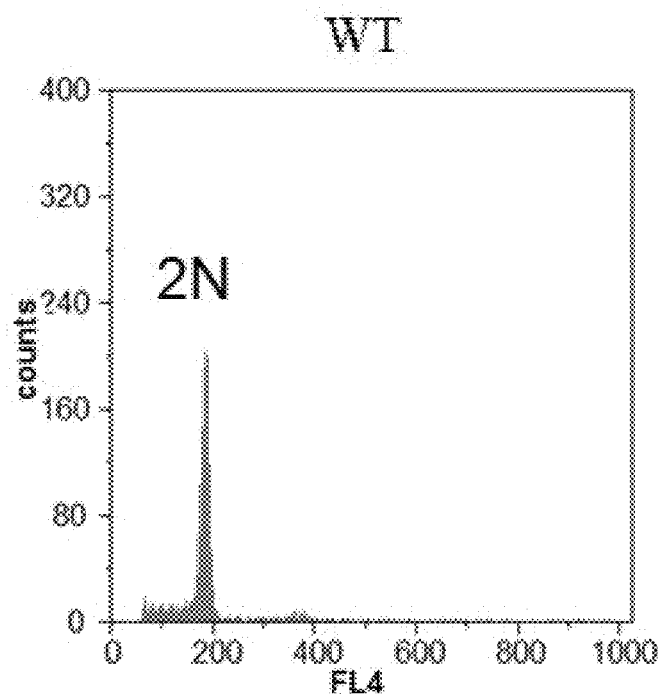
FIGS. 14A-14B show that over-expression of OBF1 leads to chromosome doubling of tobaccos as confirmed by a flow cytometer, where an over-expressed plant is named T100-2.
Figure 14B:
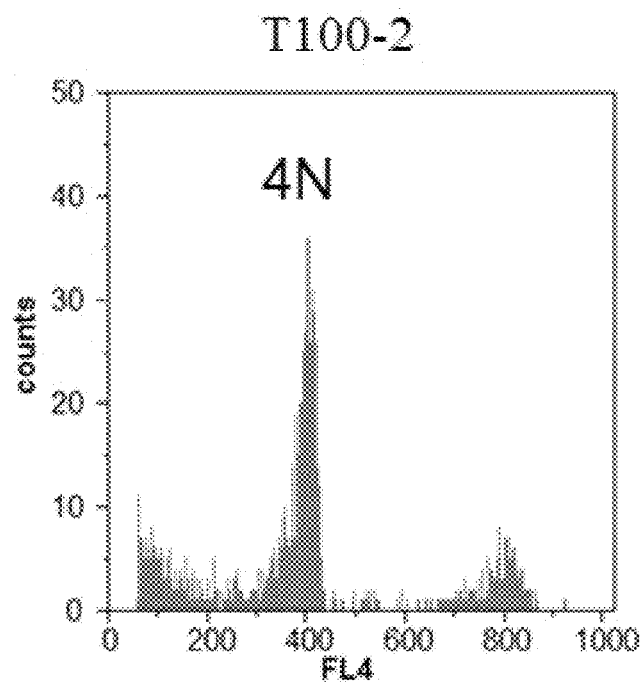

(8) The ploidy of the plants was identified by a flow cytometer, the doubling ratio of the plants under different screening concentrations of kanamycin was calculated, and the results are shown in Table 6 and FIGS. 14A-14B. As can be seen from FIGS. 14A-14B, the chromosome-doubled plant was detected as a single peak, indicating that the doubled plant was a pure line, no chimera was detected, and the probability of the homozygous plant was 100%.

Table 6 Proportion of chromosome-doubled tobaccos obtained by over-expression of OBF1 treated with different concentrations of kanamycin

| Concentration of kanamycin | Transgenic plant (plant) | Chromosome-doubled plant (plant) | Proportion of chromosome doubling (%) |
|---|---|---|---|
| 50 mg/mL | 10 | 0 | 0 |
| 100 mg/mL | 20 | 6 | 33.3 |

Figure 17:
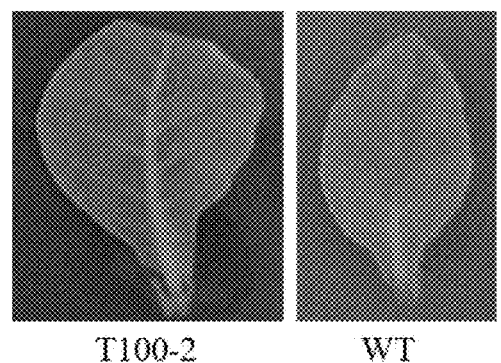
FIG. 17 shows that an ability of the tobaccos to resist gray mold is enhanced through over-expression of OBF1.

(9) The obtained leaves of the homozygous transgenic strains over-expressing the OBF1 gene were inoculated with the gray mold pathogen. Transgenic plants (T100-2) had a stronger disease-resistant phenotype compared with a wild type, as shown in FIG. 17.

Although embodiments of the present invention have been shown and described, it should be understood by those of ordinary skill in the art that various alterations, changes, substitutions, and modifications can be made to the embodiments without departing from the principle and spirit of the present invention, and the scope of the present invention is limited by the appended claims and equivalents thereof.

What is claimed is:

1. A method of an application of an OBF1 transcription factor in chromosome doubling of a plant, comprising:
introducing an OBF1 gene into initial plant cells or tissues, under a treatment with kanamycin at a concentration from 100 mg/mL to 150 mg/mL, thereby obtaining a chromosome-doubled transgenic cell line or plant; wherein the gene sequence of the OBF1 transcription factor is shown in SEQ ID NO: 1.

2. The method of the application of the OBF1 transcription factor in the chromosome doubling of the plant according to claim 1, wherein an initial plant is a dicotyledonous heterozygote.

3. The method of the application of the OBF1 transcription factor in the chromosome doubling of the plant according to claim 2, wherein the initial plant comprises petunias, tomatoes, and tobaccos.

4. The method of the application of the OBF1 transcription factor in the chromosome doubling of the plant according to claim 3, wherein the plant is transformed by an OBF1 over-expressing vector, a transformed plant is grown on a medium with the kanamycin, and the transformed plant comprises pollens, cotyledons, hypocotyls, and young leaves of the initial plant.

5. A method for cultivating an OBF1 transgenic plant, comprising the following steps:
(1) performing primer design on an ORF region of an OBF1 gene to obtain primer pairs OE_F1 and OE_R1;
(2) performing a first PCR amplification with the primer pairs OE_F1 and OE_R1, performing cloning to obtain an OBF1 ORF fragment, and constructing the OBF1 ORF fragment into a plant expression vector with kanamycin resistance to obtain recombinant plasmids;
(3) mixing 1 μL of the recombinant plasmids with 100 μL of agrobacterium competent cells to obtain a resulting mixture, and transferring the resulting mixture into an electroporation cuvette, performing electroporation transformation by the electroporation cuvette with a voltage of 2510 V, after the electroporation transformation, coating a bacterial liquid onto a Luria-Bertani (LB) solid culture medium containing antibiotics, and performing screening to obtain agrobacterium carrying the recombinant plasmids;
(4) performing culture expansion on the agrobacterium carrying the recombinant plasmids on an LB liquid culture medium;
(5) infecting juvenile tissues of an initial plant with the agrobacterium after the culture expansion, wherein the juvenile tissues are selected from the group consisting of cotyledons, hypocotyls, young leaves, pollens, and combinations thereof;
(6) culturing infected explants with a co-culture culture medium;
(7) performing induced differentiation culture on co-cultured explants with a first-generation kanamycin screening culture medium to obtain buds, comprising a kanamycin treatment concentration from 100 mg/mL to 150 mg/ml;
(8) cutting out and taking the buds, transferring cut buds to the first-generation kanamycin screening culture medium for further culture, then sequentially transferring cultured buds to a rooting culture medium for rooting culture, and transferring rooting cultured buds into soil for further culture;
(9) after seedlings subjected to the further culture in the soil grow stably, taking leaf samples, extracting DNA by a hexadecyl trimethyl ammonium bromide (CTAB) method;
performing a second PCR amplification by taking extracted DNA as a template and using primer pairs NPTII_F and NPTII_R, and identifying a plant as a positive transgenic strain, wherein the plant is a T0-generation transgenic strain;
(10) before anthers of the T0-generation transgenic strain mature and petals open, performing artificial self-pollination, and performing further culture to obtain seeds;
(11) disinfecting the seeds, and further screening disinfected seeds with a second-generation kanamycin resistant culture medium to obtain seedlings growing normally; and
(12) transferring the seedlings growing normally into nutritional soil for further culture, to obtain T1-generation homozygous positive transgenic plants, wherein the T1-generation homozygous positive transgenic plants are homozygous chromosome-doubled plants.

6. The method for cultivating the OBF1 transgenic plant according to claim 5, wherein the second-generation kanamycin resistant culture, a kanamycin treatment concentration is 15 mg/g-30 mg/g.

7. The method for cultivating the OBF1 transgenic plant according to claim 5, wherein the sequences of the primer pairs OE_F1 and OE_R1 used for the first PCR amplification of the OBF1 ORF fragment are shown in SEQ ID NO: 3 and SEQ ID NO: 4,

```
OE_F1:
ATCTCGAGATGGCATCTTCTAGTGGAAA;

OE_R1:
ATGAGCTCTCAATACTGATAGAACATAT.
```

8. The method for cultivating the OBF1 transgenic plant according to claim 5, wherein the sequences of the primer pairs NPTII_F and NPTII_R are shown in SEQ ID NO: 5 and SEQ ID NO: 6,

```
NPTII_F:
AAGATGGATTGCACGCAGGT;

NPTII_R:
AGCTTCAAAGCAGATCCAAG.
```

\* \* \* \* \*